United States Patent [19]
Bellocchi, Jr.

[11] 4,177,761
[45] Dec. 11, 1979

[54] PET PLAY HOUSE

[76] Inventor: Louis Bellocchi, Jr., 60 Newport Rd., Island Park, N.Y. 11558

[21] Appl. No.: 838,100

[22] Filed: Sep. 30, 1977

[51] Int. Cl.² ............................................. A01K 1/02
[52] U.S. Cl. .......................................... 119/19; 119/29
[58] Field of Search ............................... 119/19, 1, 29

[56] References Cited
U.S. PATENT DOCUMENTS

| | | | |
|---|---|---|---|
| 1,581,082 | 4/1926 | Clarke | 119/19 |
| 3,097,626 | 7/1963 | Felten | 119/29 |
| 3,552,356 | 1/1971 | Rosenthal | 119/1 |
| 3,618,568 | 11/1971 | Breeden | 119/19 |

Primary Examiner—Hugh R. Chamblee
Attorney, Agent, or Firm—Robert D. Farkas

[57] ABSTRACT

A pet play house utilizes an enclosure supported by rubber-like feet affixed to the exterior lowermost surface thereof. An opening is provided in the side wall of the enclosure through which the pet may ingress and egress the cavity formed thereby. A lid is slidably attached to the open-mouth portion of the enclosure. The lid is provided with an opening therein of sufficient size to allow the pet to reach a plaything or catnip, affixed to the free end of a wire-like spring material whose other end is slidably engaged to an upright dowel secured to the outermost lateral surface of the lid and extending upwardly therefrom.

8 Claims, 2 Drawing Figures

U.S. Patent  Dec. 11, 1979  4,177,761
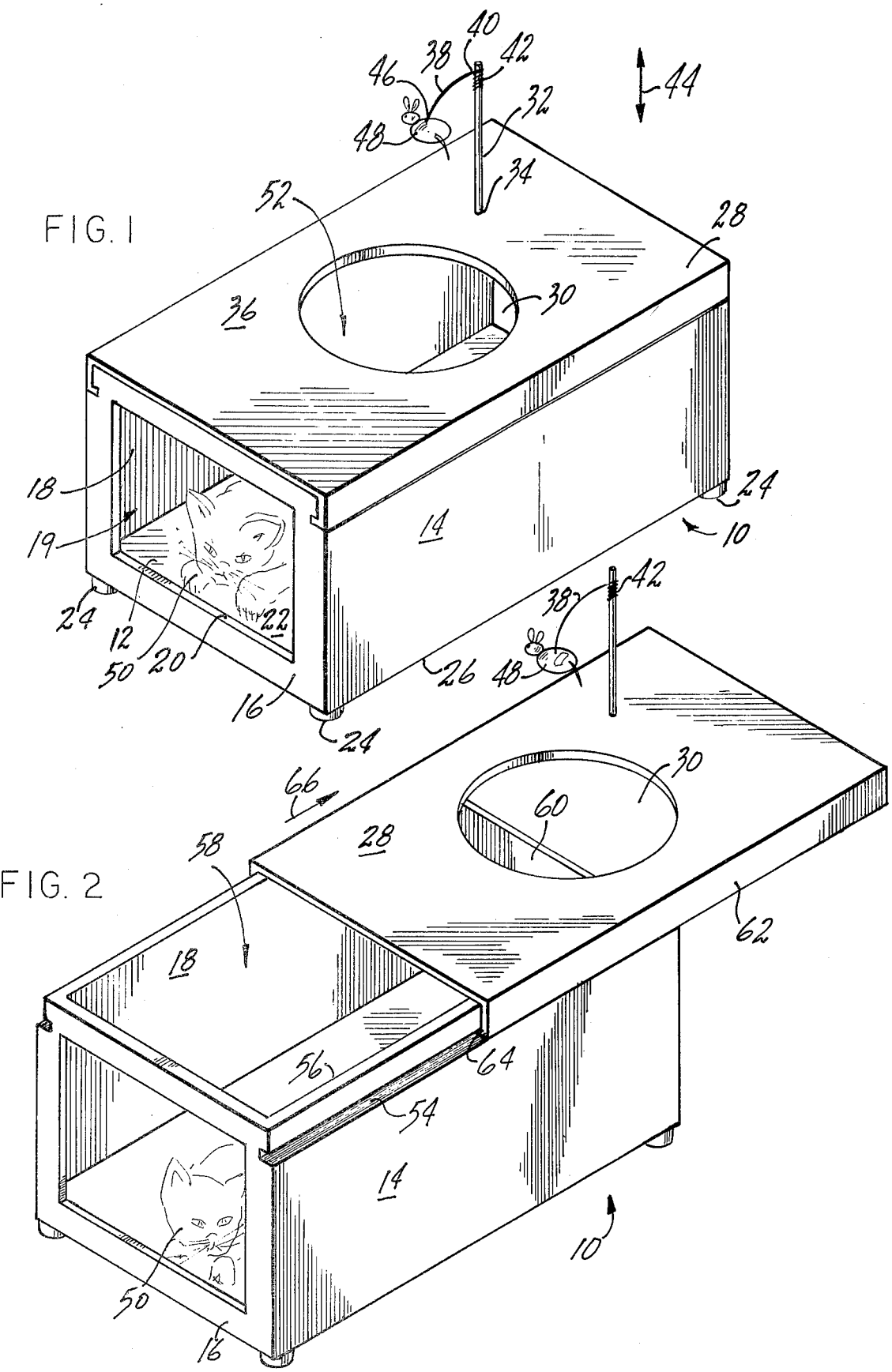

PET PLAY HOUSE

BACKGROUND OF THE INVENTION

1. Field of the Invention

This invention relates to pet enclosures and more particularly to that class of device having a unitary egressingress port provided in an enclosure which may be exposed for viewing and cleaning, utilizing a slidable superimposed panel therefor. The panel carries a hole through which a toy or other apparatus may be suspended thereover mounted to a post with a spring.

2. Description of the Prior Art

The prior art abounds with devices utilized as play houses or houses suitable for use with pets. U.S. Pat. No. 2,954,007 issued on Sept. 27, 1960 to H. Mitchell illustrates a collapsible pet animal house having a roof portion affixed to sides that are hingably secured to one another. An ingress port is provided having a hingable door secured to a marginal edge thereof. Such device fails to provide an apparatus which an animal, such as a cat or a dog may feel comfortable when reposing therein because such animals have temperaments requiring them to maintain visual access to the surrounding areas.

U.S. Pat. No. 3,618,568 issued on Nov. 9, 1971 to E. W. Breeden teaches a pet house in the form of an attractive piece of furniture which can be readily opened to a pet house usable in a person's living quarters. A drawer-like structure is provided, which when removed from the apparatus, defines an opening to an enclosure located in a wall thereof. A portion of the roof of the device is hingably secured to the walls, such that the portion, when opened up, forms a ramp leading into the interior of the apparatus by way of an opening in the roof thereof. This device fails to teach an apparatus having a unitary ingress and egress port so as to give the pet a sense of security by easily guarding such unitary port. Furthermore, said such apparatus fails to provide a play port, which the animal may utilize for exercising purposes if desired.

SUMMARY OF THE INVENTION

A primary object of the present invention is to provide a pet house which conveniently houses pets of any size, having a unitary ingress or egress port therein.

Another object of the present invention is to provide a pet or play house for animals which enables the animal to reach through an opening in the roof thereof so as to gain access to a toy or other suspended apparatus.

Still another object of the present invention is to provide a play house wherein the suspended toy is free to move actively upon accidental or purposeful touching engagement by a paw of the pet.

Yet another object of the present invention is to provide a play house whose cover portion may be removed for purposes of inspection or grasping the animal reposed therewithin.

A further object of the present invention is to provide a pet house whose basic design and construction is easily usable when modified dimensionally to accommodate pets of the quadruped family, having a variety of sizes and shapes.

Hertofore, pet houses and play devices were concerned primarily with the cost of manufacture of the facilities in providing at least an economical method of fabricating the apparatus. The present invention recognizes that a pet house suitable for use with cats and dogs should have a single entrance way end exit port, combined into a unitary port, which permits the pet to feel secure when residing within the apparatus in a resting, sleeping, or poised position. The present invention also recognizes the need to gain manual access to the interior of the quarters for cleaning the interior or for pet removal purposes, such that the pet is not permitted to reside in a portion of the interior of the enclosure which is inaccessible, either visually or manually, to the user. Furthermore, prior art devices failed to provide an apparatus which the pet could play or exercise with, whilst ensconced within the interior of the enclosure. This very fact is of great significance, recognizing that pets tend to become fatigued after play and tend to retire thereafter. The present invention permits the animal to actively engage in strenuous play, for a period of time determined solely by the animal, whilst the animal is totally enclosed within the enclosure, by reaching upwardly through an opening therein and engaging a toy carried by a spring supporting the toy. The toy, or catnip, may be manually positioned at any preferential height above the opening in the lid of the device.

These objects as well as other objects of the present invention, will become more readily apparent after reading the following description of the accompanying drawings.

BRIEF DESCRIPTION OF THE DRAWINGS

FIG. 1 is a perspective view of the present invention shown in a closed condition.

FIG. 2 is a perspective view of the present invention shown in an open position.

DESCRIPTION OF THE PREFERRED EMBODIMENT

The structure and method of fabrication of the present invention is applicable to an exercising device comprising an enclosure, preferably rectangular in nature, having a plurality of upstanding walls secured to each other and each fastened to a base. The base is fitted with rubber-like feet on an exterior lower surface thereof. The enclosure, including the walls and the base thereof, may be fabricated from a unitary plastic material, cardboard, or the like. One wall, preferably located on an end of the enclosure, is provided with a rectangular opening whose lowermost marginal edge extends somewhat above the floor of the enclosure.

The walls define an open-mouth portion of the enclosure residing in a plane extending parallel to the base of the enclosure but spaced apart upwardly therefrom. Two opposed wall members are provided with a pair of elongated notches or grooves extending along the length thereof, which are parallel to and adjacent with the open-mouth portion of the enclosure. A lid is provided for enclosing the entire open-mouth portion and has a pair of downwardly and inwardly extending legs for slidable engagement within the grooves. The fitment of the free end of the inwardly extending legs engages the grooves as so to tightly secure the lid to the opposed walls of the container carrying such grooves. The lid is provided with an elongated opening therein, of sufficient size such that the pet may reside within the enclosure formed by the lid, walls and base, and may reach upwardly through the opening in the lid, so as to have a paw extend outwardly from the enclosure.

A dowel-like rod, preferably fabricated from wood, has the lowermost end thereof fixably secured to the uppermost lateral surface of the lid at a location adjacent the opening therein. A length of elongated spring-like wire has one end thereof coiled about the rod forming a frictional sliding coupling thereto such that the spring-like wire may be positioned along the length of the dowel. Thus, the wire element may be positioned at any preferential height determined entirely by the length of the dowel. The free end of the wire-like element may be removably secured to a toy, catnip or other apparatus compatible with the nature of the pet employing the device. The floor of the apparatus may be covered, so as to provide a comfortable resting place for the animal. Alternatively, the enclosure may be utilized as a playpen apparatus by providing the floor of the apparatus with a rigid surface.

Now referring to the figures, and more particularly to the embodiment illustrated in FIG. 1 showing the present invention 10 having a base portion 12 and a plurality of walls 14, 16 and 18. Wall 16 is provided with a rectangular-like opening 19 having a lowermost marginal edge 20 thereof extending above the uppermost lateral surface 22 of base portion 12. Rubber-like feet 24 are fitted to the exterior lowermost surface 26 of base 12. Lid portion 28 is provided having an elongated opening 30 therein. Dowel 32 is shown having end 34 thereof fixedly secured to the uppermost lateral surface 36 of lid 28 at a location adjacent opening 30. Spring-like wire-like element 38 is provided having end 40 thereof wound up in a helix 42, wrapped up at dowel 32. Helix 42 is dimensioned so as to tightly engage dowel 32 so that it may be positioned vertically in the direction of arrows 44 as desired. End 46, of wire-like element 38, is removably secured to toy 48, which may be fabricated from rubber, catnip, or any other suitable material, compatible with animal 50, adapted to reside within cavity 52, cavity 52 is defined by walls 14, 16, 18 base 12 and lid 28.

FIG. 2 illustrates wall 14 being provided with groove 54 located adjacent marginal edge 56 of wall 14. An open-mouth portion 58, of present invention 10, is shown partially exposed by virtue of lid 28 being slidably displaced from the position shown in FIG. 1. Rear wall 60, is visible through opening 30 in lid 28. Lid 28 is provided with a downwardly extending leg 62 terminating in an inwardly extending leg portion 64. Leg portion 64 resides within grooves 54 in sliding frictional engagement therewith. Animal 50 may be reached manually by virtue of open-mouth portion 58 formed by sliding lid 28 in the direction of arrow 66. When lid 28 is moved in the direction of arrow 66, lid 28 may totally enclose open-mouth portion 58 thereby providing the present invention in the state shown in FIG. 1. Apparatus 48 is shown disposed over hole 30 regardless of the location of lid 28 relative to walls 14, 16 and 18. It should be noted that apparatus 48 is suspended in cantilever fashion above opening 30, thereby facilitating the ability of apparatus 48 to move freely in response to touching engagement by a paw of animal 50.

One of the advantages of the present invention is a pet house which conveniently houses pets of any size, having a unitary ingress or egress port therein.

Another advantage of the present invention is a pet or play house for animals which enables the animal to reach through an opening in the roof thereof so as to gain access with a toy or other suspended apparatus.

Still another advantage of the present invention is a play house wherein the suspended toy is free to move actively upon accidental or purposeful touching engagement by a paw of the pet.

Yet another advantage of the present invention is a play house whose cover portion may be removed for purposes of inspection or grasping the animal reposed therewithin.

A further advantage of the present invention is a pet house whose basic design and construction is easily usable when modified dimensionally to accommodate pets of the quadruped family, having a variety of sizes and shapes.

Thus, there is disclosed in the above description and in the drawings, an embodiment of the invention which fully and effectively accomplishes the object thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A pet play house apparatus comprising a plurality of walls, a base, said walls fixedly secured to said base, said walls defining an open-mouth portion opposite and above said base, a unitary opening in said walls whereby a pet may pass there through into the enclosure formed by said walls and said base, a lid, means to slidably engage said lid with said walls whereby said lid may be disposed entirely covering said open-mouth portion, said lid having an access opening therein, said access opening being smaller than said open-mouth portion, a dowel, one end of said dowel fixably secured to an exterior lateral surface of said lid, the other end of said dowel extending upwardly from said lid, a wire-like element, means to slidably frictionally engage one end of said wire-like element at selected locations along the length of said dowel, a toy, said toy carried by the free end of said wire-like element, said toy being located adjacent said opening in said lid.

2. The apparatus as claimed in claim 1 wherein said base and said walls are a unitary apparatus.

3. The apparatus as claimed in claim 1 wherein further comprising at least one rubber-like foot, said at least one rubber-like foot being fixedly secured to a lowermost lateral surface of said base.

4. The apparatus as claimed in claim 1 wherein said means to slidably frictionally engage comprises said one end of said wire-like element having a helical-like shape, said helical-like shape configured so as to frictionally engage the exterior surface of said dowel.

5. The apparatus as claimed in claim 1 wherein said means to slidably engage said lid comprises at least one groove, said at least one groove located in one of said walls, said at least one groove extending parallel to said open-mouth portion, said lid having a pair of legs, a first portion of said legs extending downwardly from an uppermost lateral surface of said lid, a second portion of said pair of legs extending inwardly from said first portion, said second portion configured to reside in said at least one groove.

6. The apparatus as claimed in claim 1 wherein said toy comprises a rubber-like material.

7. The apparatus as claimed in claim 1 wherein said unitary opening comprises a rectangular opening.

8. The apparatus as claimed in claim 7 wherein said unitary opening has a lowermost marginal edge thereof positioned residing above the uppermost lateral surface of said base.

* * * * *